United States Patent Office 2,985,617
Patented May 23, 1961

2,985,617
STABILIZED POLYMER OF 2 TO 3 CARBON ATOMS
Ival O. Salyer and Allen S. Kenyon, Dayton, Ohio, assignors to Monsanto Chemical Company, St. Louis, Mo., a corporation of Delaware
No Drawing. Filed Sept. 2, 1955, Ser. No. 532,365
16 Claims. (Cl. 260—45.7)

This invention relates to the stabilization of Ziegler type polymers. In preferred aspects the invention pertains to protecting, against the effects of thermal processing, polyethylene obtained by polymerizing ethylene in the presence of a catalyst exemplified by the material obtained by the interaction of a trialkylaluminum with titanium tetrachloride.

There has recently come into commercial prominence the polymerization of ethylene and other monomers through the agency of a type of catalyst advanced by Prof. Dr. Karl Ziegler of the Max Planck Institute at Mulheim, Ruhr, Germany. Probably the preferred group of these catalysts is that disclosed in Belgian Patent No. 533,362, issued May 16, 1955, to Ziegler, the disclosure of which is hereby incorporated herein by reference, namely catalysts prepared by the interaction of a trialkylaluminum with a compound of a metal of group IV-B, V-B or VI-B of the periodic system, including thorium and uranium, and especially compounds of titanium, zirconium and chromium. These, and the variety of other catalysts of the Ziegler type, can be considered exemplified by the catalyst obtained by the interaction of a trialkylaluminum with titanium tetrachloride. Other catalysts of the Ziegler type differ from those disclosed in the above-mentioned Belgian Patent No. 533,362 in various ways, for example, as follows: Instead of or in addition to the aluminum trialkyls, catalysts of the type described in the Belgian patent can be made by reacting the various metal compounds of groups IV-B, V-B and VI-B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these of course being reacted with compounds of groups IV-B, V-B or VI-B metals. Another Ziegler type catalyst is prepared by the interaction of an aluminum compound of the general formula $R_2AlX$ where R is a hydrocarbon radical such as alkyl or aryl, and X is a halogen, such as chlorine or bromine, with a compound of a metal of group VIII of the periodic system, e.g., iron, nickel, cobalt, or platinum, or manganese, for example dimethylaluminum monobromide plus ferric chloride, diisobutylaluminum chloride plus nickel (trivalent) chloride, diethylaluminum monochloride plus manganic chloride. Yet another combination is that of the group IV-B, V-B or VI-B metal compounds with aluminum compounds of the general formula $R_2AlX$, where R is hydrogen or a hydrocarbon radical and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler type polymerization catalysts comprises compounds of the group IV-B, V-B and VIB heavy metals as previously mentioned, combined with the alkali metal alkyls, for example with lithium-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc, for example butyl lithium plus zirconium tetrachloride, sodium tetramethylaluminum plus titanium tetrachloride or plus thorium acetylacetonate. Other Zieger-type catalysts are prepared by using (in conjunction with compounds of group IV-B, V-B and VI-B metals), instead of trialkylaluminums, triaryl-, triarylalkyl-, trialkaryl- or mixed alkyl- and aryl-aluminum, zinc, magnesium or alkali metals, e.g., phenyl sodium plus $TiCl_4$.

Those skilled in the polymerization art having knowledge of these matters, refer to catalysts of the foregoing type as Ziegler or Ziegler-type polymerization catalysts, and to polymers prepared by their action as Ziegler or Ziegler-type polymers, the terms "Ziegler" and "Ziegler-type" being used synonymously. While the principal classes of such catalysts have been listed, this listing is not to be construed as complete, and various other such catalysts than those set forth may also be used to produce polymers which, in accordance with the invention of the present application, are stabilized as will be described hereinafter. Thus, ethylene and other monomers can be polymerized by catalysts obtained by treating compounds of heavy metals, especially compounds of the group IV-B, V-B and VI-B metals, not with organo-metallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff method. Polymers of low to medium molecular weight can be obtained from ethylene and other monomers by using trialkylaluminums alone as catalysts, especially in very small amounts, as well as dialkyl berylliums, trialkyl galliums, trialkyl indiums, monoalkylaluminum dihydrides, and the various other catalysts disclosed by Ziegler in U.S. Patent No. 2,699,457. Attention is further directed to the teaching of various of the foregoing catalysts in Ziegler's Belgian Patents 534,792 and 534,888, the disclosures of which are hereby incorporated herein by reference. The essence of the present invention, however, is not to be found in the particular Ziegler type polymerization catalyst employed in making the polymers in question, but rather in the stabilization of such polymers, particularly against adverse effects of thermal processing, as will appear more fully hereinafter.

The present invention is broadly applicable to all Ziegler type polymers, i.e., all polymers prepared by polymerizing a monomer or mixture of monomers in the presence of a Ziegler type catalyst. Of especial interest, of course, are those Ziegler solid polymers of sufficiently high molecular weight to be useful in the plastics industry, but some of the benefits of the invention are obtainable with lower molecular weight Ziegler semi-solid and even liquid polymers which can be used, for example, in adhesives, as lube oil additives, etc. The preferred polymers have a molecular weight of at least 2,000 and preferably 10,000. Those Ziegler polymers to which the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution as described in the Journal für Praktische Chemie, 2nd Series, vol. 158, page 136 (1941), and J.A.C.S. 73, page 1901 (1951).

At the present time, ethylene is by far the preferred monomer for preparing Ziegler polymers. The ethylene can be homopolymerized, or can be copolymerized with varying amounts, particularly on the order of from 2 to 10 percent, of higher olefins such as propylene or butylene, especially the former. The ethylene can also be copolymerized with butadiene and/or isoprene as disclosed in the copending application of Carroll A. Hochwalt, Serial Number 502,008, filed April 18, 1955. Also of interest are the copolymers of butadiene and/or isoprene with styrene, disclosed in the copending application of Carroll A. Hochwalt, Serial Number 501,795, filed April 18, 1955. Homopolymers of butadiene and of isoprene as prepared by the use of Ziegler type catalysts are also of great interest, having exceptional low temperature properties, as disclosed in the copending application of Robert J. Slocombe, Serial Number 502,189, filed April 18, 1955. Other ethylenically unsaturated hydrocarbons whose Ziegler polymers are of potential interest include propylene, butylenes, especially butene-1, amylenes and the like. Substituted olefins are also of interest, such as vinylcyclohexene, styrene, etc. Styrene when polymerized in the presence of Ziegler type catalysts gives a high molecular weight polymer showing a crystalline structure by X-ray diffraction examination. Ziegler type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers, as disclosed in the copending application of Earl W. Gluesenkamp, Serial Number 507,717, filed May 11, 1955, can also be stabilized in accordance with the present invention. A variety of copolymers of the various monomers named above with each other and with other comonomers can be prepared by Zeigler catalysis, and the present invention in its broadest scope includes all such and in fact all polymers prepared through the agency of Ziegler type catalysts on any single monomer or mixture of monomers polymerizable with such catalysts. Despite the broad scope of the invention, it will be found more convenient in most of the present application to discuss the invention with specific reference to preferred embodiments thereof, and accordingly, Ziegler type polyethylene will be especially referred to by way of example.

No matter what methods are used to purify Ziegler type polymers, they almost invariably contain at least traces of catalyst residues. Such residues are presently believed to be at least one of the causative fatcors of the stabilization problems now to be discussed. It can also be pointed out that Ziegler polymers prepared from mono-olefinically unsaturated compounds, such as ethylene, contain a higher proportion of double bonds in the polymer molecule than is the case with polymers of the same monomers prepared under other conditions, such as free radical initiated polymerization, polymerization at high pressures with the aid of molecular oxygen as catalyst, and the like. Here again, it is believed that this increased unsaturation or perhaps at least the type of unsaturation, contributes to the difficulties. Various other postulations can be made, but the present invention is not dependent on any particular theory, but is rather based on experimental observations to be discussed. Ziegler type polymers as initially prepared generally have some color. When such polymers are subjected to thermal processing which is necessary to put the polymer in condition for most end uses, for example by hot milling, extrusion, injection molding, mixing with other materials to be used in a compounded polymer formulation, etc., a number of changes are observed to take place. One of the most serious is the development of color, and in the absence of the present invention the polymer which has been subjected to thermal processing will generally have an undesirable color and in many instances, so much color as to make it unsuitable for use in certain applications where a light color or no color is desired. Furthermore, adverse effects on the strength properties of the polymer are noted. Thus, the ultimate tensile strength generally undergoes some adverse change on only a very limited amount of thermal processing, and with prolonged processing, which is often essential in the reuse of scrap from injection and compression moldings, a severe loss in tensile strength occurs. Similarly, the polymer is subject to marked loss of tensile elongation. Various other physical properties are also adversely affected, and the ability of the polymer to flow, which of course is of much importance in injection molding, extrusion, and like techniques, may become impaired. As opposed to conventional polyethylene as prepared, say, by high pressure polymerization in the presence of oxygen as a catalyst, which tends to undergo oxidative cross-linking on thermal processing, Ziegler type polymers are more prone to undergo oxidative scission of polymer chains resulting in a decrease in the average molecular weight of the polymer material. This scission no doubt accounts for some of the adverse effects on physical properties just mentioned. Another undesirable effect noted in processing Ziegler type polymers is corrosion of metallic apparatus with which the hot polymer comes in contact, such as mill rolls, injection machines, molds, and the like.

In accordance with the present invention, one or more of the foregoing undesirable effects, the particular effects varying somewhat from case to case, are reduced or completely obviated by incorporating in a Ziegler type polymer a small but protective quantity of a material which is a stabilizer for polyvinyl chloride. In view of the entirely different nature of the well known vinyl chloride polymers as compared with the Ziegler type polymers, with which the present invention is concerned, the protective effect of polyvinyl chloride stabilizers in the Ziegler type polymers is indeed surprising and a theoretical basis for same is not apparent. Naturally, the particular adverse property or properties ameliorated by the practice of the present invention will vary from polymer to polymer, and from one polyvinyl chloride stabilizer to another. However, as will be seen from the specific examples given hereinafter, it is only necessary that a material have the property of stabilizing polyvinyl chloride against deterioration on heating in order to be operable in the present invention to at least some degree.

It should be pointed out that some classes of polyvinyl chloride stabilizers are much preferred over others in the practice of the present invention. Furthermore, members of one class are not necessarily the full equivalents of members of another class, or in fact members of the same class for all purposes of the invention. The polyvinyl chloride stabilizers generally preferred are the organo-tin compounds, which give outstanding protection to Ziegler polymers against the effects of thermal processing. The organo-lead PVC (i.e., polyvinyl chloride) stabilizers are also quite good, but less readily available commercially and less desirable from the toxicity viewpoint. The alkaline earth metal salts of long chain fatty acids, especially strontium stearate, give outstanding protection at exceptionally high temperatures, e.g., 500° F., at which many of the PVC stabilizers decompose. Another distinct class of PVC stabilizers which we have found quite useful in Ziegler polymers are the epoxy compounds. These must generally be used in much larger quantities than the organo-tin compounds, for instance. Thus, one or two parts by weight per 100 parts Ziegler polymer, of epoxy compound is usually required, while similar stabilizing effects can be obtained with most organo-tin compounds by using them in amounts ranging from 0.05 to 0.5 weight percent. It can be stated in general that the PVC stabilizer will be employed in amount within the range of 0.01 to 5.0 weight percent, based on the weight of the Ziegler polymer being stabilized. Those skilled in the art, having had the benefit of the present disclosure, will readily determine by simple tests the optimum amount to use for any particular stabilizer and any particular polymer composition. In any event the protective amount used is small, but is sufficient to reduce one or more adverse effects of thermal processing on the polymer.

Those skilled in the art are familiar with a variety of methods for incorporating stabilizers, or for that matter, small amounts of any additive, to polymers, hence a detailed description is not considered necessary. It may be pointed out, however, that the stabilizer should be intimately admixed with the polymer, and this can be done by milling it in on hot or cold mill rolls as the nature of the polymer permits, by mixing it in by the use of Banbury mixers or other well-known devices of this nature, or it may be mixed with a molding powder and incorporated during extrusion or during injection molding, or may be incorporated into a solution of the polymer which solution may then be employed for the formation of films, for wet or dry spinning of fibers, monofilaments, and the like. The stabilizer may be added as such or may first be dissolved in a suitable solvent as the particular mixing procedure warrants. In any event, it is quite desirable to incorporate the stabilizer with the polymer when the latter has undergone as little thermal processing as possible.

In order to give a comprehensive disclosure of suitable classes and suitable individual stabilizers for polyvinyl chloride, all of which can be employed in the practice of the present invention, reference is made to the article "The Stabilization of Vinyl Resins," by H. Verite Smith, appearing in British Plastics, 25, pages 304–307 inclusive (September 1952). All of said article, and each of the thirty-one "Notes and References" appearing at the end thereof, are hereby incorporated by reference in the present application; in this manner unduly lengthening of the present application is avoided. The Smith article not only discusses the various classes of PVC stabilizers, in accordance with their chemical structure, but also in accordance with their theoretical function or functions in the stabilization of vinyl chloride polymers and copolymers and furthermore lists a large number of specific compounds. Reference to the article shows that the theory of PVC stabilization developed over many years calls for such a stabilizer to act as an HCl acceptor, and/or as a dienophile, and/or as an antioxidant. Whether any of these presumed mechanisms of PVC stabilization is involved in our stabilization of Ziegler polymers is un——known—in view of our discovery of the effectiveness of PVC stabilizers for Ziegler polymers, it may now be postulated that some mechanisms may be operative, but, as pointed out, whether or not this is so is unknown and it would certainly not be expected to be so as an a priori proposition.

In the practice of the present invention, among the preferred organo-tin compounds and organo-lead compounds are the alkyl and aryl lead and tin compounds, such as tetraphenyl tin, dibutyl diphenyl tin, a mixture of dibutyl diphenyl tin plus 2-phenyl indole, fatty acid salts of alkyl and aryl lead such as tributyl lead ricinoleate, the oxides and hydroxides of alkyl, aryl and mixed alkyl and aryl tin and lead, e.g., dibutyl tin oxide, low polymers obtained by the hydrolysis of materials such as dibutyl tin diacetates, e.g., the diacetate of dianhydrotrisdibutyl-stannanediol which has the following structure where C₄ means butyl:

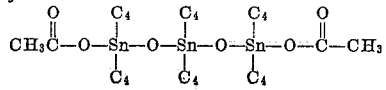

dialkyl lead and tin dicarboxylates, e.g., dibutyl tin dilaurate, and in general all of the organo-lead and -tin compounds disclosed in the following patents to Victor Yngve: 2,219,463, 2,267,777, 2,267,778, 2,267,779, 2,307,090, 2,307,092. Also of particular interest are mixtures of dialkyl tin dicarboxylates, such as dibutyl tin dilaurate, and their hydrolysis polymers, with calcium acetoacetate, epoxy resins, barium and cadmium ricinoleates and glycidyl ethers of polyalkyleneglycols, e.g., 2,3-epoxybutyl ether of diethylene glycol. Other suitable materials are the alkyl tin alcoholates, modified alkyl tins, e.g., tetra-α-thienyl tin disclosed by Fincke and Gluesenkamp in U.S. No. 2,479,918, and organo-tin salts of the α,β-unsaturated carboxylic acids, e.g., dibutyl tin maleate and crotonate, triethyl lead hexyl maleate, triethyl lead hexyl maleate mixed dibutyl diphenyl tin.

A variety of basic lead compounds, some of which can also be classified as organo-lead compounds, can be used, such as lead carbonate, lead stearate, hydrous tribasic lead sulfate, lead silicate especially mixed with silica gel, basic lead phosphate, dibasic lead phthalate, basic lead acylates, e.g., basic lead 2-ethylhexoate, normal lead silicate, dibasic lead stearate, dibasic lead phosphate, dibasic lead phosphite; it is sometimes advantageous to employ cinnamic acid monoethoxymaleate, and other synergists with the basic lead stabilizer.

Other materials which are stabilizers for polyvinyl chloride and which can be employed to stabilize Ziegler polymers in accordance with the present invention include a variety of metallic soaps, i.e., metallic salts of saturated fatty acids, especially those containing from 8 to 20 carbon atoms, for example the stearates of calcium, barium, cadmium, lead, lithium, strontium, magnesium, zinc, aluminum, tin, bismuth. It is sometimes advantageous to include with these materials alkyl or aryl phosphites. Further, it is often found that mixtures of two of these materials are better than either alone, for example, mixtures of cadmium and lead stearate, mixtures of barium and zinc stearate, etc. Similar metal salts of unsaturated acids can also be used, such as the metal ricinoleates, especially those of cadmium and barium, such materials also being among those classed as antioxidants in the theoretical scheme of polyvinyl chloride stabilizers, in view of their unsaturated acid radical.

In general, weak bases are found to be useful, many of the compounds mentioned hereinabove such as the basic lead compounds and the metallic soaps being examples of weak bases. Simple materials such as sodium carbonate, basic lead carbonate, and even calcium oxide are effective.

We particularly like to employ epoxy organic compounds as stabilizers for Ziegler polymers. Materials of this class include, for example, glycidyl ethers of polyalkylene glycols as described in U.S. 2,555,169 to Voorthuis; the various epoxy resins, for example, resins prepared by reacting epichlorohydrin with polyfunctional phenols, such as diphenylolpropane, alkyloxy- or aryloxy-substituted aliphatic epoxy compounds, such as phenoxy-propylene oxide, butoxy-propylene oxide and the like as described by Wiley et al. in U.S. 2,160,948; epoxidized oils, e.g., triglycerides containing the epoxy group, such as triglycerides which contain at least one double bond and may be natural such as animal and vegetable fats and oils or synthetic triglycerides and related materials such as unsaturated fatty acid esters of polyhydric alcohols, which have been epoxidized, e.g., by reaction with peracetic acid as described by Swern et al. in U.S. 2,569,-502, e.g., epoxidized lard oil, olive oil, castor oil, peanut oil, cottonseed oil, soybean oil, corn oil, linseed oil, menhaden oil and the like.

Those stabilizers for polyvinyl chloride particularly noted as dienophiles, which of course include some of the materials mentioned hereinabove, can also be employed in the practice of the present invention, for example, maleic anhydride, compounds of the nature of triethyl lead hexylmaleate as disclosed in the patent to W. R. Richard, U.S. 2,477,349, monoalkoxy ethyl esters of fumaric and maleic acids used in conjunction with basic lead compounds as disclosed in the patent to J. R. Darby, U.S. 2,539,362, alkaline earth metal salts of alpha-beta, gamma-delta unsaturated monobasic acids such as calcium sorbate, barium alpha-furacrylate, as well as chelates such as the metal derivatives of 1,3-dicarboxylic compounds, e.g., calcium ethylacetoacetate, barium diisopropyl salicylate and the like.

The foregoing listings are not to be construed as being a complete list of all materials which can be employed in the practice of the present invention. Other specific compounds, and classes of compounds, not given above also are effective to stabilize polyvinyl chloride and thus are within the broad scope of the present invention. Thus, for example, there can be mentioned the substituted ureas such as diphenylurea, diphenylthiourea, para-ethoxyphenylurea, N,N'-bis-(p-ethoxyphenyl)urea, especially when employed with basic salts such as sodium carbonate, basic lead salts and the like. The disclosure given herein will, however, serve to advise those skilled in the art of the general groups of materials contemplated, as well as particular classes and specific stabilizers preferred to be used. Attention is again specifically directed to the article by Smith in British Plastics referred to above, particularly the table on page 306 listing American proprietary stabilizers by the source company and brand together with compositions, each and all of which commercially available stabilizers can be employed in the practice of the present invention to stabilize Ziegler type polymers.

More detailed information will now be given on preferred process conditions and catalysts for preparing various Ziegler polymers. We prefer to polymerize the chosen monomer in the presence of a catalyst prepared by the interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminums, e.g., triethylaluminum, triisobutylaluminum, trioctylaluminum, with titanium tetrachloride.

Suitable aluminum compounds to be reacted with the chlorides, bromides or iodides of titanium or zirconium are those represented by the general formula $R_2AlX$ wherein R is an alkyl, cycloalkyl or aryl radical and X is hydrogen, halogen, or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-(β-phenylethyl)aluminum
Diethylaluminum chloride
Diisobutylaluminum chloride
Diisobutylaluminum iodide
Di-(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valance. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mol ratio of aluminum compound to titanium (or zirconium) compound, or stated another and simpler way, the mol ratio of aluminum to titanium (or zirconium), can very over a wide range, suitable values being from 0.3:1 to 10:1 on up to 15:1 or higher. It is generally preferred to use an Al:Ti mol ratio between 0.5:1 and 5:1. The same ratios apply in the case of the zirconium compounds. While active catalysts can be prepared by a variety of procedures, the simplest and perhaps most effective is to add the titanium or zirconium halide to the aluminum compound, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example from 5 to 30 parts by weight solvent per 1 part by weight total polymer produced. These inert solvents, which are solvents for the monomers, some of the catalyst components, and some of the polymers, but are non-solvents for many of the polymers, e.g., polyethylene, can also properly be termed inert liquid diluents.

The amount of catalyst required is dependent on the other variables of the polymerization reaction, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.003:1.

The polymerization can be effected over a wide range of temperatures, again the particular preferred temperature being chosen in accordance with the monomer, pressure, particular catalyst and other reaction variables. For many monomers from room temperature down to say minus 40° C. and even lower are suitable, and in many cases it is preferred that the temperature be maintained at below about 35° C. However, for other monomers, particularly ethylene, higher temperatures appear to be optimum, say from 50 to 75° C. for ethylene. Temperatures ranging up to 100° C. and higher are generally satisfactory for Ziegler type polymerization.

The pressure at which the polymerization is carried out is dependent upon the chosen monomer or monomers, as well as other variables. In most instances, the polymerization is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and in some instances on polymer quality. The choice of whether or not to use an appreciably elevated pressure will be one of economic and practical considerations taken into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like. For this reason, suitable precautions should be taken to protect the catalyst and the reaction mixture from such materials. An excess of the aluminum compound, particularly mol ratios of aluminum to titanium or zirconium in excess of about 4:1, tends to give a certain amount of protection against these poisons. The monomers and diluents or solvents, if used, need not be pure so long as they are reasonably free from poisons. However, best results are ordinarily obtained if the monomer feed contains at least 90 weight percent and preferably higher of the polymerizable monomer, exclusive of any solvent material.

The monomer or mixture of monomers is contacted with the catalyst in any convenient manner, preferably by bringing the catalyst and monomer together with intimate agitation provided by suitable stirring or other means. The agitation can be continued during the polymerization, or in some instances the polymerization mixture can be allowed to remain quiescent while the polymerization takes place. In the case of the more rapid reactions with the more active catalysts, means can be provided for refluxing monomer and solvent if any of the latter is present, and thus remove the heat of reaction. In any event adequate means should be provided for dissipating the exothermic heat of polymerization. If desired, the monomer can be brought in vapor phase into contact with the solid catalyst, in the presence or absence of liquid solvent. The polymerization can be effected in the batch manner, or in a continuous manner, such as for example, by passing the reaction mixture through an elongated reaction tube which is contacted externally with suitable cooling medium to maintain desired reaction temperature.

The polymer will be recovered from the total reaction mixture by a wide variety of procedures, chosen in accordance with the properties of the particular polymer, the presence or absence of solvent and the like. It is generally quite desirable to remove as much catalyst from the polymer as possible, and this is conveniently done by contacting the total reaction mixture, or the polymer after separation from solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a non-solvent, such non-solvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low-boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

As a matter of general information, the following description is offered of some of the properties of various Ziegler polymers, all of which can be stabilized in accordance with the present invention. The Ziegler type catalysts can be employed to polymerize styrene and vinyl aromatic hydrocarbons generally, i.e., hydrocarbons containing a $CH_2=CH-$ group directly attached to an aromatic ring, e.g., vinyltoluene, vinylnaphthalene, vinylxylene, vinyl methylnaphthalene, vinylisopropylbenzene and the like. See the copending application of Roland J. Kern, Serial Number 498,254, filed March 31, 1955. There are produced polyvinyl aromatic hydrocarbons, e.g., polystyrene, having a crystalline nature as determined by X-ray diffraction analysis, as well as a lower molecular weight amorphous acetone soluble material. The crystalline polystyrene is highly resistant to the action of heat and the action of solvents. These properties adapt it particularly for injection and compression molded articles, and for extrusion and other methods of forming into films, fibers, tubes and other shapes. It can of course be formulated with various pigments, dyes, fillers, other polymers and the like as may be desirable to impart particular desired characteristics. It can be drawn out into fibers where the crystallinity has a desirable strengthening effect. Likewise, films can be oriented by unidirectional or bidirectional stretching thereby obtaining greatly increased strength. In all such processing, in view of the high softening and melting point of the polystyrene, it will be seen that the stabilization provided by the present invention is of particular value and importance.

Application of the Ziegler type catalysts to the homopolymerization of butadiene, homopolymerization of isoprene, and the copolymerization of butadiene with isoprene in all proportions, is taught in copending application of Robert J. Slocombe, Serial Number 502,189, filed April 18, 1955. These diolefin polymers are vulcanizable (conventional vulcanizing agents can be used) elastomeric materials having outstanding low temperature properties. For example, butadiene polymerized by the action of a catalyst prepared from triethylaluminum plus titanium tetrachloride, when subjected to the Clash- Berg test (essentially that described in Ind. Eng. Chem. 34, 1218 (1942)), had a rubber temperature ($T_{2000}$) of minus 12° C. and an extrapolated brittle temperature ($T_f$) of minus 167° C.; its second order transition temperature (approximated by $T_f$) is much lower than conventional polybutadiene, yet the polymer is much stiffer at ordinary atmospheric temperatures, the resultant very broad transition range being of much importance in practical applications of the rubber.

Butadiene or isoprene can be copolymerized with vinyl aromatic hydrocarbons, such as styrene or any of the vinyl aromatic hydrocarbons mentioned above, in the presence of Ziegler type catalysts, as disclosed in the copending application of Carroll A. Hochwalt, Serial Number 501,795, filed April 18, 1955. These copolymers cover the entire range of proportions of the diolefin on the one hand with the vinyl aromatic hydrocarbon on the other hand, but those containing a major weight proportion of diolefin and a minor weight proportion of vinyl aromatic hydrocarbon are preferred. The preferred copolymers are vulcanizable (conventional vulcanizing agents can be used) elastomeric materials, which are flexible at much lower temperatures than synthetic rubbers prepared from the same monomers under conventional conditions, yet are stiffer than said conventional rubbers at temperatures ranging from somewhat below room temperature and above. A copolymer of butadiene and styrene prepared by the action of a catalyst obtained by reacting triethylaluminum with $TiCl_4$, when subjected to the Clash-Berg test, had an extrapolated $T_f$ of minus 83° C., and a $T_{2000}$ of plus 9° C.

Ethylene can be copolymerized with butadiene or isoprene or mixtures of same, in the presence of Ziegler type catalysts, as disclosed in the copending application of Carroll A. Hochwalt, Serial Number 502,008, filed April 18, 1955. Such copolymers can be made having a major weight proportion of ethylene and a minor weight proportion of the diolefin, or a major weight proportion of diolefin and a minor weight proportion of ethylene, the variations in monomer proportions in the polymer covering the entire range from a very small proportion of ethylene to a very small proportion of diolefin in the copolymer. These copolymers are vulcanizable, and conventional vulcanizing agents can be used. Those copolymers containing a major proportion of diolefin are elastomeric materials, while those containing largely ethylene with a minor weight proportion of diolefin resemble ethylene homopolymer prepared by Ziegler catalysis but have improved low temperature properties. Thus a copolymer of ethylene with butadiene containing combined in the polymer molecule a preponderance of ethylene, was prepared by the action of a catalyst obtained by reacting triethylaluminum with $TiCl_4$, and when subjected to the Clash-Berg test had a $T_f$ of minus 60° C. and a $T_{2000}$ of plus 80° C. The Stifflex range was thus 140° C., as opposed to approximately 115° C. for a typical commercial polyethylene prepared by conventional oxygen-catalyzed high pressure polymerization.

Vinyl ethers can be homopolymerized or copolymerized with other monomers, especially ethylenically unsaturated hydrocarbon comonomers, in the presence of Ziegler type catalysts, as disclosed in copending application of Earl W. Gluesenkamp, Serial Number 507,717, filed May 11, 1955. A great variety of products can be made, depending on the particular vinyl ethers chosen, any comonomers chosen, reaction conditions, and particular Ziegler type catalysts. Of especial interest are tacky polymers obtained by the homo- or copolymerization of alkyl vinyl ethers, which find use in the field of adhesives. A copolymer containing a major weight proportion of ethylene and a minor proportion of vinyl ether can be prepared which has the general physical characteristics of polyethylene, but is somewhat softer and more adhesive and thus of special use in the interlayer of laminated safety glass, and as a readily printable film. Thus, a homopolymer of ethyl vinyl ether prepared by the action of a catalyst obtained by reacting triethylaluminum with $TiCl_4$ was a sticky, resinous material suitable for use as an adhesive. Copolymers of ethylene with various vinyl ethers, such as ethyl vinyl ether and 2-ethylhexyl vinyl ether were obtained by action of the same catalyst, the copolymer of ethylene with ethyl vinyl ether containing 28 weight percent ethyl vinyl ether, having by the Clash-Berg test a $T_f$ of minus 20° C. and a $T_{2000}$ of plus 114° C. and being useful as interlayer in glass laminates.

Ethylene is readily homopolymerized, or copolymerized, for example with small amounts of propylene or butylene, in the presence of Ziegler type catalysts, to give a polyethylene of higher density (usually about 0.94 and above), greater crystallinity, and much higher softening point, than polyethylene obtained by conventional high pressure oxygen-catalyzed polymerization. Great variation in molecular weight can be obtained with consequent variation in properties, the most important molecular weight ranges being from 50,000 up to 1,000,000 and higher.

The foregoing information has been given by way of example of various Ziegler type polymers. These and all other Ziegler polymers are effectively stabilized against adverse effects of thermal processing, by the incorporation therein of small quantities of polyvinyl chloride stabilizers, in accordance with the present invention.

It will be understood of course that the various Ziegler type polymers have a great variety of uses depending upon their particular properties and that in applying the polymers to such uses they can have added thereto a great variety of fillers, dyes, pigments, reinforcing agents, other polymers, plasticizers, softeners, tackifiers, and the like. In order to illustrate some of the uses to which the Ziegler polymer of the greatest present commercial interest can be put, the following discussion is given with respect to polyethylenes made by Ziegler type catalysis. All of these uses can be accomplished with Ziegler polyethylene not containing our stabilizers. However, it will be evident that by incorporating same into the Ziegler polyethylene, one or more of the advantages of the present invention can be realized.

Commercial polyethylene made by high pressure polymerization is not calendered into film, probably because of its low molecular weight and sharp melting point. However, by Ziegler catalysis, ethylene can be polymerized into high molecular weight polymer of good toughness and with a thermal processing range sufficiently broad to permit calendering into film and sheets ranging from thin film up to heavy gauge sheeting. However, only those Ziegler polyethylenes having a specific viscosity (0.1 weight percent in xylene at 100° C.) within the range of 0.1 to 0.3 are suitable, and those having a specific viscosity of 0.15 to 0.25 are most satisfactory. Calendering temperatures are above 135° C., generally within the range of 150 to 250° C., and in most instances 175 to 200° C. will be used.

Films and fibers can be prepared from Ziegler polyethylene by known procedures, such as spinning or extruding from the melt, wet or dry spinning or extruding from solutions, film casting, etc. The films, fibers, monofilaments, ribbons or other such structures are preferably oriented by stretching while being formed, and are greatly increased in strength by cold drawing after formation, either at room temperature or above, e.g., 50° C. Cold drawing at the higher temperatures leads to a clearer material. The cold drawing can be unilateral, or in the case of structures other than fibers, e.g., films, can be bilateral. Most Ziegler polyethylenes do not give a clear appearance on cold drawing at room temperature. Use of certain of the polyvinyl chloride stabilizers disclosed herein results in a clear, cold drawn material. Alternatively, the orienting can be accomplished by rapidly quench cooling the film or fiber, for example by extruding a sheet or filament directly into cold water (or other cooling medium) then stretching it lengthwise or biaxially which also results in a clear cold drawn structure.

Ziegler polyethylenes of not too high a molecular weight can be formed into thin films by the technique commonly called inflated balloon or film blowing, such as described in U.S. Patent Nos. 2,461,975, 2,461,976 and 2,632,206. However, to avoid too rapid set-up, it is desirable to blow the bubble in a heated atmosphere. Those polymers having a specific viscosity (0.1 percent in xylene at 100° C.) of 0.1 to 0.2 are most suitable.

Laminates having a variety of excellent properties and uses can be made by laminating sheets or films of Ziegler polyethylene with other polymers, either of the rubbery or rigid type. Ziegler polyethylene with its solvent resistance, hardness, good gloss and other desirable properties, can be used as one or more external surfaces of a laminate, or can be used for its mechanical properties as one or more interlayers. The sheets to be laminated are laid up and joined together by heat and pressure, and/or with adhesives. Metal wires or cables for carrying electricity can be advantageously insulated by the use of one or more inner layers of a rubber plus an outer layer of Ziegler polyethylene. An excellent laminate, or even a single sheet or other structure, can be prepared from fibers of Ziegler polyethylene plus conventional lower melting polyethylene prepared by high pressure polymerization, the mass being heated sufficiently to at least soften the lower melting polyethylene and intimately bind the materials together.

One type of laminate is a laminated phonograph record wherein the playing surface is composed of Ziegler polyethylene, preferably of the higher density type. Rather than laminating to paper or other supporting medium, the entire record can be made of the Ziegler polyethylene composition, and in any event the record can be prepared by injection or compression molding. The Ziegler polyethylene has better scratch resistance than previously known polyethylenes, so that the playing grooves can be cut or molded directly in the polyethylene surface. For best results, the Ziegler polyethylene is compounded with minor amounts of carbon black and other suitable fillers, lubricants, etc., as known in the record art.

By incorporation of a sufficient amount of conductive carbon black, preferably acetylene black, in the phonograph records they can be destaticized, i.e., static electricity is ready dissipated. By using a still greater percentage of conductive carbon black or other conductive filler, "mother" records can be made on which metal masters are plated by known electroplating procedures, the conductive Ziegler polyethylene "mother" record being used as the cathode. Similarly, other moldings, a light, low current carrying wire (e.g., for use in military communications), conductive floor tile, and the like can be prepared from Ziegler polyethylene containing suitable proportions of conductive carbon black. The hardness and good surface gloss of Ziegler polyethylene make it particularly suitable for such floor tiles. For that matter, without being conductive but by incorporating suitable fillers and other compounds with Ziegler polyethylene, excellent floor tiles and wall tiles can be prepared.

A slurry or suspension of Ziegler polyethylene in kerosene, xylene, hexane, water, or other inexpensive liquid can be used directly for continuous film casting. A coating of the suspension of desired thickness is placed on a support, and this is then heated sufficiently to drive off the suspending liquid and to form a continuous film of Ziegler polyethylene. This is possible because of the extremely fine particle size in which Ziegler polyethylene is produced by the polymerization reaction.

Very even thin films can be produced on paper or other surface by dusting dry Ziegler polyethylene powder onto the surface to give a reasonably even coating, as by use of a doctor blade, and then heating to coalesce the particles into a continuous film. This again is based on the very fine particle size in which Ziegler polyethylene can be obtained from the polymerization, and the fact that such powder undergoes an 8-fold reduction in volume on heating so that any irregularities in the initial powder film are hardly measurable on the resulting continuous films. Ziegler polyethylene can also be used as a filler in paper, as by adding to a slurry of paper fibers prior to formation of the paper itself.

The fine particle size in which Ziegler polyethylene is obtained, less than 200 mesh, is such that the powder can be directly adapted to flame spraying. The improved solvent- and heat-resistance of the coating obtained by flame spraying of Ziegler polyethylene makes this a very promising application.

Ziegler polyethylene for whatever use, where the appearance is significant, can be provided with fluorescent, phosphorescent, and pearlescent effects by suitable pigmentation.

Ziegler polyethylene as ordinarily prepared transmits light in such a way that a high percentage of the transmitted light is diffuse and a low percentage direct. Special thermal treatments to control the size of the spherulites can be used to advantage to enhance this effect. These factors, plus the desirable physical properties, permit the preparation of light diffusing panels in moldings of unusual quality from Ziegler polyethylene. Thus, there can be prepared a rigid, self-supporting Ziegler polyethylene panel frosted on one side and undulated on another, for use as a light diffuser.

Rigid clear polymers, such as polystyrene, polymethyl methacrylate, styrene/acrylonitrile copolymers, can be given a very attractive pearlescent effect by incorporating therein a small amount of Ziegler polyethylene, suitable quantities of the latter generally being within the range of 2 to 10 weight percent of the total polymer mixture. The polyethylene may be incorporated either by dissolving or dispersing it in the monomer or monomers followed by polymerization in mass, suspension, emulsion or solution, or by compounding the polyethylene into the other polymer by mixing on mill rolls, extruders, Banbury mixers, etc. A Ziegler polyethylene is used which has a different refractive index, and different flow properties, from the clear base polymer, resulting in a high degree of pearlescence in injection molded structures.

Films, tapes and various shaped structures such as bottles and the like, can be made by extrusion or injection or compression molding of Ziegler polyethylene, and then cross-linked to a limited degree by being subjected to penetrating radiation, such as a stream of high energy electrons, gamma-rays from radioactive materials, e.g., cobalt-60 or waste fuel elements from nuclear reactors, X-rays, or a beam of gamma-rays or of neutrons from a nuclear reactor. Previously known polyethylenes when thus cross-linked shrink when heated to 95–110° C., then creep somewhat above 110° C. However, radiation of Ziegler polyethylene to cross-link same gives a product that does not shrink at even 130° C. and much higher. Even a very mild radiation greatly increases the melt extensibility of the polymer, thus aiding subsequent fiber spinning, extrusion and other such operations. Structures made from Ziegler polyethylene and then irradiated have extremely high resistance to heat.

The usually opaque, but translucent, films or moldings prepared from Ziegler polyethylene can be heated above the melting point, then cooled quickly, i.e., quenched, to give a clearer product. This clarity can be further improved, and stabilized, by reheating just to the melting point and cooling normally. It may be noted that the same procedure can be applied to conventional polyethylene, i.e., that made at high pressures with oxygen or peroxide catalysts, to improve the clarity thereof.

Rigid foams of new utility for thermal and electrical insulation, structural use, and other uses can be made by foaming Ziegler polyethylene, either by decomposition of a thermally unstable compound intimately dispersed in the polymer or by volatilization of a low boiling solvent intimately dispersed in the polymer. A very desirable application is a laminate of such foamed Ziegler polyethylene with paper, which is very useful for wall paneling, shipping containers and the like.

Ziegler polyethylenes have many other uses, among which can be mentioned especially their addition to waxes used in making waxed papers, floor waxes, shoe polishes and the like. Ziegler polyethylenes not employing the stabilizers of the present invention can be employed in all the uses and applications discussed in this and the next preceding several paragraphs. However, the present invention can be employed in all of these uses and applications, and is of special value where color or mechanical properties are of significance.

In another aspect of the present invention, Ziegler polymers are stabilized by the addition thereto of a material which is a stabilizer for polyvinyl chloride, and additionally have added thereto a material which is an antioxidant for natural or synthetic rubbers. Such antioxidants are well known to the art, the most important being the phenolic type and amine type. The rubber antioxidant is added in small but protective amounts. A synergistic effect between the polyvinyl chloride stabilizer and the rubber antioxidant is observed. The chemical or physical function of the rubber antioxidant is not known at this time, but it may be postulated that it serves to protect double bonds in the Ziegler type polymer molecule from the adverse effects of contact with oxygen at elevated temperatures, particularly against oxidative scission of the polymer chain. The quantity of rubber antioxidant to be employed will of course vary greatly depending upon the Ziegler type polymer in question, the rubber antioxidant in question, the proportion of polyvinyl chloride stabilizer employed, presence or absence of other materials in the finished polymer composition, and the intended end use of the polymer composition. In general, however, the rubber antioxidant will be used in amounts within the range of 0.005 weight percent for the most effective antioxidants, to 5.0 weight percent for the least effective antioxidant. In most cases the amount used will be within the range of 0.1 to 2.0 weight percent, i.e., parts by weight rubber antioxidant per 100 parts by weight Ziegler polymer. By synergistic effect, it is meant that by a combined use of a polyvinyl chloride stabilizer and a rubber antioxidant, a Ziegler type polymer can be given a greater degree of protection against one or more adverse effects of thermal processing, including adverse effects on color, flow, and tensile strength and elongation, than is obtained through the use of the particular quantity of polyvinyl chloride stabilizer alone, or the use of the particular quantity of rubber antioxidant alone.

While this aspect of the invention in its broadest scope contemplates the use of any material which is an antioxidant for rubber, certain of such materials are preferred. Noteworthy among these are the sulfides of dialkylphenols, especially the mono- and disulfides of dialkyphenols. All those classes of compounds disclosed in U.S. Patent 2,364,338 to Beaver, and in U.S. Patent 2,670,382 to Downey and Zerbe, are very suitable. Of especial interest because of their ability to obtain the desired effect when used even in very small quantities, are the materials which can be described as a sulfide of a monohydric dialkylphenol in which a carbon atom of each two nuclei of the phenol are joined together by less than three sulfur atoms and the alkyl groups contain less than six carbon atoms and at least one alkyl group is a branched chain alkyl group and which is unsubstituted, except for sulfur, in two of the positions ortho- and para- to the hydroxy group. Preferred are sulfides of alkyl cresols in which the alkyl radical contains up to 12 carbon atoms, and in particular is a branched chain alkyl radical containing less than six carbon atoms. For example, 4,4'-thiobis-(6-tert-butyl-m-cresol), which can also be properly named di(1-hydroxy-3-methyl-6-tert- butyl-phenyl) monosulfide, available commercially under the trademark Santowhite Crystals, is outstanding, particularly in combination with the organo-tin polyvinyl chloride stabilizers, giving an excellent synergistic effect therewith. Other suitable commercially available rubber antioxidants are Flectol H (polymerized 1,2-dihydro-2,2,4-trimethylquinoline), Flectol White (4,4'-cyclohexylidene diphenol), Santoflex AW (6-ethoxy-1,2-dihydro-2,2,4-trimethylquinoline), Santoflex B (1,2-dihydro-2,2,4-trimethyl-6-phenylquinoline), Santoflex BX (blend of 85 parts Santoflex B and 15 parts N,N'-diphenyl-p-phenylenediamine), Santoflex 35 (blend of 65 parts Santoflex B and 35 parts N,N'-diphenyl-p-phenylenediamine), Santovar A (2,5-di-tert-amylhydroquinone), Santowhite L (essentially thiobis-(di-secamylphenol)), Santowhite MK (reaction product of 6-tert-butyl-m-cresol and $SCl_2$), Santowhite Powder (4,4'-butylidenebis(6-tert-butyl-m-cresol)), Sulfasan R (4,4'-dithiodimorpholine), AgeRite Alba (hydroquinone monobenzyl ether), AgeRite Hipar (mixture of phenyl-beta-naphthylamine, p-isopropoxy diphenylamine, and diphenyl-p-phenylene diamine), AgeRite HP (mixture of phenyl-beta-naphthylamine and diphenyl-p-phenylene diamine), AgeRite White (symmetrical di-beta-naphthyl-p-phenylenediamine), Aminox (low temperature reaction product of diphenyl amine and acetone), Neozone Standard (25% m-toluylenediamine, 50% phenyl-alpha-naphthylamine, and 25% stearic acid), Neozone D (phenyl-beta-naphthylamine), Solux (normal p-hydroxy phenyl morpholine), Stabilite (diphenyl ethylene diamine), Antioxidant 2246 (2,2'-methylene-bis(4-methyl-6-t-butyl phenol)). As general classes of rubber antioxidants there can be mentioned particularly the substituted phenols; the amino phenols; the aldimines and ketimines, i.e., reaction products of aldehydes with amines and of ketones with amines, respectively; substituted diphenylamines; secondary naphthyl amines; primary aromatic amines; secondary alkarylamines.

The chosen rubber antioxidant can be incorporated into the polymer in any suitable fashion, including all those methods mentioned earlier for incorporating the polyvinyl chloride stabilizer into the polymer. The antioxidant can be incorporated before, during or after the incorporation of the PVC stabilizer.

It is sometimes advantageous to have a small amount of a rubber antioxidant, or a PVC stabilizer, or both, present during any one or more or all of the wash procedures described hereinbefore, i.e., the procedures by which catalyst is removed from polymer. For example, either or both can be present in an alcohol used to remove catalyst from polymer, and/or in a low-boiling hydrocarbon used to wash the polymer between an alcohol treatment and a drying step. Preferably, no contact of polymer with air is permitted before polymer is contacted with rubber antioxidant, or polyvinyl chloride stabilizer, or both, in this manner. So long as the alcohol or other wash liquid is centrifuged, decanted, or filtered off from the polymer, which is the usual case, some of the added PVC stabilizer and/or rubber antioxidant will be removed along with the liquid. It may then be necessary to adjust the amount of either, or both, in the polymer prior to subjecting it to further use such as thermal processing operations as milling or injecting molding wherein it is to be protected from adverse effects by the presence of these additives.

In order to illustrate some of the various aspects of the invention, and serve as a guide in applying the invention, the following specific examples are given. It will, of course, be understood that variations from the particular catalysts, monomers, PVC stabilizers, rubber antioxidants, and proportions of same, can be made without departing from the invention.

EXAMPLE 1

The data reported in accompanying Table I were obtained with Ziegler type polyethylene which was a composite of the products of six separate batch polymerizations, each of which was carried out at substantially the same conditions and in substantially the same manner, as follows:

A 20-gallon stirred kettle reactor was charged with catalyst plus sufficient kerosene to make a total of 100 pounds kerosene. The catalyst had been prepared in a separate vessel by adding, to a stirred mixture of 12.3 pounds kerosene and 0.68 pound triisobutylaluminum, a solution of 1.36 pounds $TiCl_4$ in 12.3 pounds kerosene, over a period of about 20 minutes. An additional 6.2 pounds kerosene was then added, the mixture stirred for 5 more minutes, and then the catalyst allowed to stand for 1 to 3 days. The catalyst was stirred briefly prior to charging a portion thereof to the polymerization reactor. The charged portion was such that the reactor contained catalyst representing 0.18 pound triisobutylaluminum and 0.35 pound $TiCl_4$. This is an aluminum:titanium mole ratio of 0.5 and a total catalyst:kerosene weight ratio of approximately 0.005. The entire preparation of catalyst and charging of reactor was accomplished under the protection of lamp grade nitrogen to exclude all atmospheric oxygen, moisture and other catalyst poisons. The reactor containing kerosene and catalyst was then charged with ethylene to a pressure of 0.37 pound per square inch gauge, and, while stirring, the internal temperature was raised to a value of about 70° C. Ethylene was continuously charged to maintain a pressure of 0.37 p.s.i.g., until a total quantity of ethylene in the neighborhood of 13 pounds had been charged. This required about 2 hours' reaction time, and resulted in the production of from 7 to 11 pounds polyethylene in the various individual batch polymerization runs.

Polyethylene was recovered after each run by procedures which involved first transferring the polymer slurry directly from the polymerization reactor to a wash kettle. The washings were effected with the exclusion of air. In some of the runs the following steps were carried out. After filtering off excess kerosene, 100 pounds isobutanol was charged to the kettle, and the slurry heated with agitation to 95–97° C. and maintained at this temperature for 2 hours; the slurry was then filtered hot on a 1-plate pressure filter and washed with 75 pounds isobutanol. This procedure was then repeated. The filter cake was then reslurried in hexane (50 pounds) and heated at 62–65° C. for 10 minutes. The slurry was then cooled to 50° C., filtered on a 1-plate vacuum filter and washed with hexane (15 pounds). The polymer was then dried 4 to 5 hours in a vacuum pan dryer at less than 30 mm. mercury absolute pressure with 45° C. water in the dryer jacket. In the other runs, the work-up was similar, except that 33 pounds isobutanol was added to the total reaction slurry including the kerosene, and this mixture heated at 85–90° C. for ½ hour before recovering the polymer by filtration. The cake was washed with about 75 pounds isobutanol. It was then subjected to the series of steps described above for the other runs, except that the heating times were 1 hour rather than 2, and less isobutanol was used to wash the filter cakes.

Polyethylene from each of the six individual batch polymerizations, carried out as just described, was composited. The polyethylene was a very tough, high molecular weight material, particularly useful as a tough, strong injection molding, extrusion or calendering polymer where significant gains in general toughness properties are obtained, though at some expense in processibility, moldability and gloss in injection moldings.

*Table I.—Physical properties of high molecular weight polyethylene composite*

I. TESTS ON MOLDING POWDER

Reciprocal apparent density (bulk factor) powder _____ 8.25.
Reciprocal apparent density (bulk factor) extruded pellets _____ 1.88.
Extrusion rate (1″ NRM extruder 120 r.p.m. 200° C. powder) g./min _____ 1.6.
Extrusion rate (1″ NRM extruder 120 r.p.m. milled sheet granulation) _____ 13.4.
Melt extensibility _____ Nil.
Film blowing characteristics _____ Could not blow film.
Minimum molding temperature (MMT) (tensile die, 1 oz. Watson Stillman), °C _____ 155.
Corrosion (in extrusion or molding of stabilized polymer) _____ None noted.
Specific viscosity (0.1 %PE in xylene, 100° C __ 0.299.
Molecular weight (Harris method) _____ 180,000.
Melt index (dg./min.) _____ 0.1.

II. TESTS ON COMPRESSION MOLDINGS

|  | 0.1% diacetate of dianhydrotrisdibutyl stannanediol plus 0.01% Santowhite Crystals [1] | 0.01% Santowhite Crystals [1] |
|---|---|---|
| Density | 0.9401 | 0.9405. |
| Tensile properties: |  |  |
| Strength yield/break (p.s.i.) | 3,195/3,765 | 3,447/2,982. |
| Elongation yield/break (percent) | 10/750 | 13/633. |
| Flexural strength: |  |  |
| Strength at yield (p.s.i.) | 3,107 | 3,154. |
| Deflection at yield (in.) | 0.42 | 0.42. |
| Impact strength (notched Izod.-ft. lbs./in. notch) | No break | [2] 7.60. |
| Low temperature brittleness (50% breaks, °C.) | No breaks at −78. | No breaks at −78. |
| Clash-Berg modulus: |  |  |
| $T_f$ 135,000 p.s.i. (modulus temperature, °C.) |  | −1.3. |
| $T_{2000}$ (200 p.s.i. modulus temperature, °C.) |  | 118.7. |
| Stifflex range (°C.) |  | 120.0. |
| Room temperature (25° C. modulus) (p.s.i.) |  | 64,000. |
| Environmental cracking (time, hours for 100% breaks): |  |  |
| 0.060″ specimen | No breaks in 24 hrs. | No breaks in 24 hrs. |
| 0.125″ specimen | do | Do. |
| Zero tensile strength temperature (°C.) | 130 | 130. |

III. TESTS ON INJECTION MOLDINGS

| Tensile properties: |  |  |
|---|---|---|
| At 5″/min. rate of straining: |  |  |
| Strength yield/break (p.s.i.) (at MMT plus 50° C.) | —/7,860 | —/4,367. |
| Strength yield/break (p.s.i.) (At MMT plus 5° C.) | —/8,560 | —/7,615. |
| Elongation yield/break (percent) (at MMT plus 50° C.) | —/15.5 | —/16.8. |
| Elongation yield/break (percent) (at MMT plus 5° C.) | —/15.8 | —/14.0. |
| At 1″/min. rate of straining: |  |  |
| Strength yield/break (p.s.i.) | —/7,310 | —/3,927. |
| Strength yield/break (p.s.i.) (at MMT plus 5° C.) | —/8,235 | —/6,951. |
| Elongation yield/break (percent) (at MMT plus 50° C.) | —/16.7 | —/16.8. |
| Elongation yield/break (percent) (at MMT plus 5° C.) | —/16.4 | —/12.6. |
| Flexural properties: |  |  |
| Strength yield (p.s.i.) (at MMT plus 50° C.) | 3,772 | 3,447. |
| Strength yield (p.s.i.) (at MMT plus 5° C.) | 3,792 | 3,949. |
| Deflection at yield (in.) (at MMT plus 50° C.) | 0.46 | 0.38. |
| Deflection at yield (in.) (at MMT plus 5° C.) | 0.42 | 0.40. |
| Impact strength (notched Izod): |  |  |
| MMT plus 50° C. ft. lbs./in. notch. | [3] 13.80 | No break. |
| MMT plus 5° C. ft. lbs./in. notch. | No break | [3] 11.7. |
| Oven heat distortion (no load) (°C.) | 128–131 | 128–131. |
| Color [4] (molded at MMT plus 50° C.) | Off white (1 G) | Dark gray (3 G). |
| Gloss | Fair [5] | Fair.[5] |
| Density at— |  |  |
| MMT plus 50° C |  | .9364. |
| MMT plus 5° C |  | .9363. |

[1] "Santowhite" ® Crystals is essentially 4,4′-thiobis-(6-tert-butyl-m cresol).
[2] Three samples molded, one broke, two did not.
[3] Five samples molded, two broke, three did not.
[4] Arbitrary visual color scale runs from 1 (white) to 10 (very dark); G means gray cast.
[5] Gloss on 2″ disc was better than for commercial high pressure polyethylene and poorer than for polyethylene made by same process as this but of lower molecular weight.

In Table I, the data presented in the first section headed "I. Tests on Molding Powder," were obtained on the polyethylene which had been composited by 3 or 4 passes through an extruder. The data in section headed "II. Tests on Compression Moldings" and section headed "III. Tests on Injection Moldings" were obtained on test moldings prepared by standard plastics testing procedures. It will be noted that data are given for the polymer containing 0.01 weight percent of 4,4'-thiobis-(6-tert-butyl-m-cresol), sold commercially under the name of "Santowhite Crystals," and the same test polymer containing the same concentration of Santowhite Crystals plus 0.1 weight percent of the diacetate of dianhydrotrisdibutylstannanediol. Santowhite Crystals is a well-known rubber antioxidant. The diacetate of dianhydrotrisdibutylstannanediol is a well-known polyvinyl chloride stabilizer. In each case, the polyethylene composite was milled for 5 minutes on mill rolls having a surface temperature of 170° C. during which time the Santowhite Crystals, or the Santowhite Crystals plus the tin compound, respectively, were added to the polyethylene and thus intimately incorporated therein. In the case where both materials were added, the tin compound was added first. The compression molded test samples were made directly from the polymer in which the added materials had thus been incorporated, while the injection molded test samples were made from the polymer which had been subjected to one operation of extrusion and cutting in the pellets prior to formation of the injection molded test sample. In Table I, where a dashed line appears in lieu of data, it means that particular test was not run at all; the exception to this is found in the tensile tests on injection molded samples, in which no yield occurs during the tensile tests.

The data show that the use of the diacetate of dianhydrotrisdibutylstannanediol is advantageous with respect to several properties. Particular attention is directed to the improvements in the tensile strength and elongation in the compression molded samples, in the tensile strength in the case of the injection molded samples at both rates of straining and at both molding temperatures, and in the impact strengths (taking all the samples into consideration) on the compression molded samples. The difference in color of the materials is especially noteworthy, that containing only the rubber antioxidant being dark gray in appearance, while that containing the rubber antioxidant plus the polyvinyl chloride stabilizer being an off-white. In considering these data, it should be borne in mind that this polyethylene material was separated from the reaction mixture and worked up under conditions selected to give excellent removal of catalyst residues, yet despite this the polymer without the added polyvinyl chloride stabilizer was found quite subject to deterioration on thermal processing.

EXAMPLE 2

Separate portions of the polymer composite described in Example 1 were milled for 20 minutes on a mill roll having a surface temperature of 170° C. To one such sample no material at all was added, and this acted as the control to determine the effects of this thermal processing on the polyethylene. To another sample, 0.005 weight percent of 4,4'-thiobis-(6-tert-butyl-m-cresol), sold commercially under the trademark "Santowhite" Crystals, was incorporated in the initial stages of the milling. To another sample 0.1 weight percent of the diacetate of dianhydrotrisdisbutylstannanediol was incorporated in the initial stages of the milling. To yet another sample both Santowhite Crystals in the concentration of 0.005 weight percent and the stannanediol compound just mentioned in the concentration of 0.1 weight percent were incorporated in the initial stages of the milling. Data on the thus milled samples are presented in Table II. The tensile properties were determined on compression molded standard test strips.

Table II

[20 minutes' milling]

| Additive | Conc., Percent | Density | Tensile Properties | | | | Color [2] |
|---|---|---|---|---|---|---|---|
| | | | P.s.i. | | Elongation | | |
| | | | Yield | Break | Yield | Break | |
| Santowhite Crystals [1] | 0.005 | 0.9391 | 3,592 | 2,355 | 15 | 625 | 3 G |
| Diacetate of dianhydrotrisdibutylstannanediol | 0.1 | 0.9392 | 3,314 | 4,201 | 15 | 860 | 1 G |
| Santowhite Crystals [1] | 0.005 | | | | | | |
| Stannanediol compound | 0.1 | 0.9393 | 3,267 | 3,000 | 15 | 660 | 1 G |
| No additive | | 0.9400 | 3,443 | 2,520 | 12 | 555 | 3 G |

[1] Santowhite ® Crystals is 4,4'-thiobis-(6-tert-butyl-m-cresol).
[2] Arbitrary visual color scale runs from 1 (white) to 10 (very dark); G means gray cast.

Examining Table II, it will be seen that the density of the polyethylene after the processing was little affected by the presence or absence of additive; thus, the total crystallinity, which is roughly proportional to the density, was not appreciably altered. However, marked differences in the tensile properties are noted. Thus, while the polyethylene containing only Santowhite Crystals had a tensile strength at break of 2355 p.s.i., that containing only the stannanediol compound was considerably stronger, the tensile strength at break being 3000 p.s.i. However, that containing both the stannanediol compound and the Santowhite Crystals had remarkably greater strength, the tensile strength at break being 4201 p.s.i. Thus, a synergistic effect between the two types of stabilizers is clearly demonstrated. The tensile elongation at break follows the same pattern, in that for Santowhite Crystals alone, stannanediol compound alone, and both together, respectively, the tensile elongation, in percent, was 625, 660, and 860, respectively. The polyethylene containing no additive had a tensile strength at break of only 2520 p.s.i. and elongation at break of only 555 percent.

EXAMPLE 3

The same polyethylene composite employed in Example 1 was also used in this example. It was stabilized by the addition of 2.0 weight percent epoxidized soybean oil plus 0.01 weight percent 4,4'-thiobis-(6-tert-butyl-m-cresol), i.e., Santowhite Crystals. The stabilizers were incorporated in the polymer on the mill roll in the early portion of an initial 5-minute milling on mill rolls having a surface temperature of 170° C. Samples of the thus-stabilized polyethylene were withdrawn from the mill after 5 minutes' milling, 30 minutes' milling, and 60 minutes' milling. Data on these samples, together with data on control containing only 0.01 weight percent Santowhite Crystals (same as Example 1) shown for comparison, are given in Table III.

The epoxidized soybean oil was prepared by the method of Terry and Wheeler, U.S. Patent 2,458,484, in which hydrogen peroxide is used to make peracetic acid with which the soybean oil was reacted. Performic acid can also be used. The epoxidized soybean oil analyzed:

Oxirane oxygen, wt. percent_____ 6
Iodine number_____ 3.3 vacuum filter and washed with 25 lbs. isobutanol. The filter cake was then reslurried in 100 lbs. isobutanol, heated at 93° C. for two hours, cooled and filtered on a vacuum filter. The filter cake was then washed on the filter with 30 lbs. hexane. The polymer was then dried

*Table III*

| Additive | Conc., Percent | Milling Time, min. | Density | Tensile Properties | | | | Specific Viscosity |
|---|---|---|---|---|---|---|---|---|
| | | | | P.s.i. | | Elongation | | |
| | | | | Yield | Break | Yield | Break | |
| Epoxidized soybean oil | 2.0 | 5 | .9423 | 2,985 | 3,907 | 16 | 790 | .235 |
|  |  | 30 | .9426 | 2,924 | 4,347 | 16 | 900 | .188 |
|  |  | 60 | .9447 | 3,054 | 1,984 | 15 | 526 | .139 |
| Santowhite Crystals [1] | 0.1 | | | | | | | |
| Santowhite Crystals [1] | 0.01 | 5 | .9405 | 3,447 | 2,982 | 13 | 633 | .299 |

[1] "Santowhite" ® Crystals is essentially 4,4′-thiobis-(6-tert-butyl-m-cresol).

The data shown that on five minutes' milling, the average molecular weight has been decreased somewhat as reflected by the lower specific viscosity, but the tensile properties are better in the material containing the epoxidized soybean oil. This material actually shows much improved tensile properties on milling for 30 minutes, the ultimate tensile strength, i.e., tensile strength at break, being 4347 p.s.i. and the elongation at break being 900 percent. On further milling for a total of 60 minutes, which of course is quite a severe test, the tensile properties have become considerably poorer than in the starting material.

Another very important observation, not shown in the table, is that the samples of the Ziegler polyethylene contaning the epoxidized soybean oil drew clear when the tensile test molding was pulled on the testing machine. That is, the polyethylene was compression molded into a standard tensile test specimen, and as is typical for partially crystalline polymers, on being stretched the material "necks down." The control sample, as well as a sample containing no additive whatsoever, gave a "necked down" portion which was translucent but not transparent, as is typical with Ziegler polyethylenes. This is in contrast to the behavior of polyethylene prepared under high pressure with oxygen as catalyst, which gives a clear transparent "necked down" portion. The sample containing the epoxidized soybean oil plus Santowhite Crystals also gave a "necked down" portion which was clear and transparent. This was true with the samples milled 5, 30 and 60 minutes. This behavior of course is very important in the formation of films, monofils, fibers, and any structure in which the Ziegler polyethylene is subjected to cold drawing, since product clarity is a very desirable property and can be obtained by incorporating epoxidized soybean oil prior to any such cold drawing operation.

EXAMPLE 4

Polyethylene was prepared by the same general procedure described in Example 1. The total kerosene charged was 100 pounds, the catalyst was made from triethylaluminum plus $TiCl_4$ with an aluminum to titanium mole ratio of 0.50. The weight ratio of total catalyst to kerosene was 0.0065. Ethylene charged was 12.5 pounds, and the polymerization required 45 minutes giving essentially complete conversion of ethylene to polyethylene. The ash content of the polyethylene was 0.18 weight percent. The washing procedure, which will now be described, was not as satisfactory as that given in Example 1, and the polymer had very poor color.

The polyethylene slurry was filtered on a one-leaf pressure filter and washed with 50 lbs. kerosene. The polymer was then removed from the filter (with exposure to air) and slurried in 100 lbs. isobutanol. The slurry was heated at 90° C. for two hours, cooled and filtered on a 13 hours in a vacuum tray dryer with about 70° C. water in the coils.

The data in Table IV were obtained on various samples of this polyethylene which had undergone 5 minutes' milling on mill rolls having a surface temperature of 170° C. The additives in each case were incorporated in the polyethylene in the first portion of the milling. All the samples contained 100 parts per million (0.01 weight percent) of Santowhite Crystals, a rubber-antioxidant. One of the samples contained no other additives. One of the samples contained 2.0 weight percent dibutyl tin maleate, a PVC stabilizer. One of the samples contained 0.05 weight percent of the diacetate of dianhydrotrisdibutylstannanediol, a PVC stabilizer.

*Table IV*

[5 minutes' milling]

| Additive, weight percent: | | | |
|---|---|---|---|
| Santowhite Crystals [1] | 0.01 | 0.01 | 0.01 |
| RS-13 [2] | | 2.0 | |
| Stannanediol compound [3] | | | 0.05 |
| Color [4] | 9 G | 3 G | 3 G |
| Compression molded test samples: | | | |
| Impact strength, lbs./in. notch | 1.2 | 1.1 | 1.0 |
| Tensile strength, p.s.i. (yield/break) | 2,815/1,657 | 3,168/1,775 | 3,153/1,879 |
| Tensile elongation, percent (yield/break) | 16/337 | 11/603 | 11/437 |
| Flexural strength, p.s.i. (yield) | 2,754 | 3,021 | 2,976 |

[1] Santowhite ® Crystals is essentially 4,4′-thiobis-(6-tert-butyl-m-cresol).
[2] RS-13 is dibutyl tin maleate.
[3] Stannanediol compound is diacetate of dianhydrotrisdibutylstannanediol.
[4] Arbitrary visual color scale runs from 1 (white) to 10 (very dark); G means gray cast.

Perhaps the outstanding differences noted in Table IV are the colors of the polyethylene samples. Both the samples containing the tin compounds had a rather good color, actually much improved on milling, as compared with the extremely poor dark brown color of the sample not containing the tin compound.

The advantageous effects of both tin compounds on the tensile properties is readily noted. Similar improvement is shown in the flexural strength.

EXAMPLE 5

In the manner described in Example 1, ethylene was polymerized, employing 100 pounds total kerosene charged, and a weight ratio of total catalyst to total kerosene of 0.005. The catalyst was prepared in the polymerization reactor from triisobutylaluminum and titanium tetrachloride, with an aluminum to titanium mole ratio of 0.5. A total of 13 pounds ethylene was charged and the reaction time was 43 minutes.

The polymer was washed according to the first procedure described in Example 1, but isobutanol slurries from the washing operations were separated by using a 20 inch perforated basket centrifuge, resulting in production of a much drier filter cake and more effective cake washing than that obtained employing a pressure filter plate. Further, only about 40 pounds isobutanol was used each time to wash the filter cake, rather than 75 pounds isobutanol. The polyethylene thus prepared and washed and then dried, contained less than ½ part per million titanium, and 17 parts per million aluminum.

The stabilized samples on which physical data are presented in Table V were prepared and milled in the same manner described in Example IV. Total milling time was 5 minutes, at 170° C., surface temperature of the mill rolls. One sample contained 0.01 weight percent 4,4'-thiobis-(6-tert-butyl-m-cresol) (Santowhite Crystals), while the other contained the same, plus 1.0 weight percent dibutyl tin maleate (RS-13).

Table V

[5 minutes' milling]

| Additive, weight percent: | | |
|---|---|---|
| Santowhite Crystals [1] | 0.01 | 0.01 |
| RS-13 [2] | | 1.0 |
| Color [3] | 3 G | 2 G |
| Compression molded: | | |
| Impact strength, lbs./in. notch | 1.9 | 1.7 |
| Tensile strength, p.s.i. (yield/break) | 3,386/1,914 | 3,270/2,252 |
| Tensile elongation, percent (yield/break) | 12/483 | 12/695 |
| Flexural strength, p.s.i. (yield) | | |
| Injection molded: | | |
| Impact strength, lbs./in. notch | 3.6 | 2.6 |
| Tensile strength, p.s.i. (yield/break) | —/6,665 | —/7,883 |
| Tensile elongation, percent (yield/break) | —/11 | —/10 |
| Flexural strength, p.s.i. (yield) | 4,109 | 4,362 |

[1] Santowhite ® Crystals is essentially 4,4'-thiobis-(6-tert-butyl-m-cresol).
[2] RS-13 is dibutyl tin maleate.
[3] Arbitrary visual color scale runs from 1 (white) to 10 (very dark); G means gray cast.

In examining the data in Table V, it is again seen that the dibutyl tin maleate PVC stabilizer resulted in a better color than obtained in its absence. Differences in impact strength in the compression molded samples were of little significance, but the impact strength in the injection molded samples was significantly lower in the case of the PVC stabilizer-containing material. However, in all other properties tested, i.e., tensile strength, tensile elongation, and flexural strength, the polyethylene containing the dibutyl tin maleate plus Santowhite Crystals was superior to that containing only Santowhite Crystals in both compression molded and injection molded samples.

EXAMPLES 6–10

The data for Examples 6–10 inclusive are tabulated in Table VI. The polyethylenes differ from example to example, with the exception that the polyethylene used in Examples 6 and 8 was the same, but all were made by polymerizing ethylene at atmospheric or near atmospheric pressure and temperatures below 100° C. in kerosene containing catalyst made by reacting a trialkylaluminum with titanium tetrachloride. All, with the exception of Example 10, were prepared on the laboratory scale, i.e., in smaller quantities than those given in the preceding examples. The polyethylene used in Example 10 was prepared in a continuous circulatory reaction system.

Table VI

| Example No. | Stabilizer Added | Conc. | Milling, minutes | Tensile Properties | | | | Flow Properties | | Color |
|---|---|---|---|---|---|---|---|---|---|---|
| | | | | Strength, p.s.i. | | Elong., percent | | Melt Index | Memory, percent | |
| | | | | Yield | Break | Yield | Break | | | |
| 6 | Santowhite Crystals [1] | 50 p.p.m. | 5 | 3,150 | 1,610 | 10 | 235 | 4.6 | 31 | Tan. |
| | CaCO₃ | 1.0 | 5 | 4,209 | 1,627 | 19 | 155 | 3.1 | 49 | Off white. |
| 7 | Santowhite Crystals | 50 p.p.m. | 5 | 3,490 | 3,225 | 5 | 730 | 0.1 | 14 | Do. |
| | do | 50 p.p.m. | 30 | 3,455 | 2,278 | 10 | 447 | 0.1 | 11 | Do. |
| | CaCO₃ plus | 1% | | | | | | | | |
| | Santowhite Crystals | 50 p.p.m. | 30 | 3,623 | 2,527 | 10 | 470 | 0.3 | 18 | Do. |
| 8 | Santowhite Crystals | 50 p.p.m. | 5 | 3,150 | 1,610 | 10 | 235 | 1.8 | 38 | Lt. brown. |
| | Witco Stayrite 229 [2] plus | 1.70 | 25 | 3,320 | 1,715 | 15 | 300 | 1.2 | 39 | Lt. tan. |
| | Santowhite Crystals | 50 p.p.m. | | | | | | | | |
| 9 | Santowhite Crystals | 50 p.p.m. | 5 | 3,471 | 2,490 | 15 | 650 | 0.3 | 25 | 2 [3]. |
| | RS-31 plus | 0.5% | 20 | 3,186 | 2,531 | 15 | 740 | 0.4 | 26 | 9 [3]. |
| | Santowhite Crystals | 50 p.p.m. | | | | | | | | |
| 10 | Santowhite Crystals | 50 p.p.m. | 5 | 3,229 | 2,465 | 15 | 671 | 1.2 | 31 | 3 G [3]. |
| | CaO | 10% | 5 | 3,410 | 2,950 | 10 | 775 | 0.3 | 11 | 2 G [3]. |

[1] Santowhite ® Crystals is essentially 4,4'-thiobis-(6-tert-butyl-m-cresol).
[2] Witco Stayrite 229 is an organo lead compound.
[3] Arbitrary color scale runs form 1 (white) to 10 (very dark); G means gray cast.

The tensile properties were determined on compression molded samples. In determining the flow properties, the melt index is the rate of flow, in decigrams/minute, of the molten polymer through a fixed orifice, under standardized conditions, and the memory is the percentage by which the diameter of the extruded strand of polymer exceeds the diameter of the orifice. All of the milling was done on mill rolls having a surface temperature of 170° C.

In Example 6, the use of 1 percent calcium carbonate, a polyvinyl chloride stabilizer, gives particular improvement in the tensile strength at yield, and in the color. These advantages are noted with just 5 minutes' milling.

In Example 7, the effects of Santowhite Crystals, and Santowhite Crystals plus calcium carbonate, are noted on the polymer when milled for 30 minutes, as contrasted to the control containing Santowhite Crystals and milled 5 minutes. It will be seen that the polymer containing Santowhite Crystals only, after milling 30 minutes, still has good physical properties though in general they have deteriorated appreciably from those of the control. However, the polymer also containing 1% calcium carbonate shows tensile strength at both yield and failure to be superior to that not containing the calcium carbonate.

In Example 8, the effects of using 1.7 weight percent of a commercial polyvinyl chloride stabilizer, viz. Witco Stayrite 229 (an organo-lead compound), is shown. All of the tensile properties are superior to those of the control despite the 25 minutes' milling. Further, the color is much better than that of the control.

Example 9 shows the effects of employing another commercial polyvinyl chloride stabilizer, in this case RS-31 which is a tin mercaptan compound. Both control milled for 5 minutes and the test sample milled for 20 minutes, contained 50 parts per million Santowhite rubber antioxidant. The data show that this particular polyvinyl chloride stabilizer is useful where the polyethylene is to be used for industrial purposes or in pigmented form, but would not be used where the color is of importance since the color of the test sample was much poorer than that of the control. However, the tensile strength at failure, and tensile elongation, after 20 minutes milling are better than the tensile properties for a control milled five minutes, and the flow properties have not greatly changed despite the milling.

Example 10 shows that even large quantities of a basic substance such as calcium oxide, namely 10%, can be employed with advantageous results, both the color and the tensile properties being better than the control. The flow of course is decreased somewhat by the presence of such a large amount of added solids.

EXAMPLES 11–13

The data in Table VII show the effects of various typical rubber antioxidants in combination with a polyvinyl chloride stabilizer. The stabilizer employed ("tin compound") was the diacetate of dianhydrotrisdibutyl-stannanediol, used at a concentration of 0.1 weight percent. All samples were milled 10 minutes. The polyethylene employed was the composite described in Example 1. The color scale is that described previously.

epichlorohydrin, normally highly viscous liquid (M.P. 20–28° C.), specific gravity 1.18, soluble in methyl ethyl ketone, acetone, benzene, xylene, and chloroform, insoluble in isopropanol, methanol, ethanol, and water, epoxide equivalent 225 to 290. The blend of 2% Epon Resin 834 with polyethylene was milled 20 minutes. Physical properties were then determined on compression molded samples and are given in Table IX, together with the corresponding properties for the same polyethylene without the Epon Resin but containing 0.01 weight percent Santowhite Crystals.

*Table IX*

|  | Epoxy Resin +Santowhite Crystals | Santowhite Crystals |
|---|---|---|
| Tensile properties: | | |
| Strength, yield/break (p.s.i.) | 2,992/4,068 | 3,447/2,982 |
| Elongation, yield/break (Percent) | 15/765 | 12/633 |

*Table VII*

| Example No. | Additive | Conc. of Additive, Wt. percent | Tensile Properties | | | | Color |
|---|---|---|---|---|---|---|---|
| | | | Strength, p.s.i. | | Elong., percent | | |
| | | | Yield | Break | Yield | Break | |
| 11 | Tin compound | 0.1 | 2,614 | 1,890 | 28 | 520 | 3 |
| | plus N-Cyclohexyl-N'-phenyl-p-phenylenediamine | 0.05 | | | | | |
| | N-Cyclohexyl-N'-phenyl-p-phenylenediamine | 0.05 | 2,506 | 1,848 | 24 | 470 | 5 G |
| 12 | Tin compound | 0.1 | 2,444 | 1,938 | 28 | 500 | 2 |
| | plus 2,2'-methylene-bis-(4-methyl-6-tert-butyl phenol) | 0.05 | | | | | |
| | 2,2'-methylene-bis-(4-methyl-6-tert-butyl phenol) | 0.05 | 2,373 | 1,816 | 28 | 365 | 6 |
| 13 | Tin compound | 0.1 | 2,590 | 1,846 | 25 | 550 | 1 G |
| | plus 4,4'-cyclohexylidene diphenol | 0.05 | | | | | |
| | 4,4'-cyclohexylidene diphenol | 0.05 | 2,570 | 1,811 | 22 | 490 | 2 G |

It will be seen that in the Ziegler polyethylene containing each of these varying types of antioxidants, the addition of the organo-tin compound PVC stabilizer gave improvements in both the tensile properties and the color.

EXAMPLE 14

The polyethylene composite of Example 1 was blended with 1 weight percent maleic anhydride plus 50 parts per million Santowhite ® Crystals, and milled for 5 minutes. Data obtained on this material, and for comparison data obtained on the same polyethylene containing 100 parts per million Santowhite Crystals, are presented in Table VIII.

*Table VIII*

|  | Maleic anhydride +Santowhite Crystals | Santowhite Crystals |
|---|---|---|
| Tensile properties: | | |
| Strength, yield/break (p.s.i.) | 2,893/3,502 | 3,447/2,982 |
| Elongation, yield/break (Percent) | 14/780 | 13/633 |

In addition to the marked improvement in ultimate tensile strength and in percentage elongation, the color of the sample containing the maleic anhydride was slightly better than that of the control.

The polyethylene containing maleic anhydride also exhibited the property of drawing clear. This property is described in more detail in Example 3 above, and the comments given there apply also to the use of maleic anhydride in Ziegler polyethylene whereby clear, cold drawn structures are obtained.

EXAMPLE 15

The Ziegler polyethylene composite of Example 1 was blended with 2 weight percent of Epon Resin 834 (Shell Chemical Corp.). Epon Resin 834 is an epoxy resin which is a condensation product of Bisphenol A with The specific viscosity of the milled material was 0.113 as compared with 0.299 for the unmilled polymer, indicating that some molecular weight degradation has taken place, but the physical properties have been improved, as shown by the markedly superior ultimate tensile strength and elongation. As in the case of the maleic anhydride of Example 14 and the epoxidized soybean oil of Example 3, the presence of this epoxy resin in the Ziegler polyethylene caused by the polymer to become clear when cold drawn, with the consequent advantages discussed in Example 3.

EXAMPLES 16–24

In the manner described in Example 1, ethylene was polymerized employing 102 pounds kerosene, 13.5 pounds ethylene, and a total polymerization time of 130 minutes. The catalyst was prepared from triisobutylaluminum and titanium tetrachloride, with an aluminum to titanium mole ratio of 0.5 and a weight ratio of total catalyst to kerosene of about 0.005. The polymer was contacted with isobutanol before being allowed to contact with the air, and after thorough washing with isobutanol was dried in a vacuum tray drier at less than 30 mm. mercury absolute pressure at 40° C.

The thus prepared polymer was admixed with 100 parts per million Santowhite Crystals, plus a variety of commercial polyvinyl chloride stabilizers in the amount of 0.05 and 0.5 weight percent. A sample of the polymer containing only 100 parts per million Santowhite Crystals was used as control. Color, and tensile properties, were determined on these polymers containing the various stabilizers after 5 minutes' milling, and after 20 minutes' milling, on mill rolls having a surface temperature of 170° C. The data are given in the accompanying Table X.

The polyvinyl chloride stabilizers employed were as follows:

Example:
- 16—Advastab 3 [1]—organo-tin salt, polymeric (hydrolyzed) anhydrobisbutyl polystannanediol dibutyl ester
- 17—Advastab 52—organo-tin salt (chemically similar to Advastab 3)
- 18—Advastab OM-10—organo-tin salt (chemically similar to Advastab 3), of low volatility
- 19—Advastab 143—cadmium salt of a carboxy acid in a phosphate ester plasticizer
- 20—Advastab CH-14—liquid chelating phosphite (triphenyl phosphite)
- 21—Advastab E-6-B—polymeric epoxy compound (epoxidized unsaturated polymeric ester)
- 22—Advastab SN—strontium salt of a carboxy acid (strontium naphthenate) in a phosphate ester plasticizer medium
- 23—Thermolite RS-13—dibutyl tin maleate
- 24—Paraplex G-60—epoxidized oil (Rohm & Haas epoxidized soybean oil, 60% epoxidized)

[1] "Advastab" is a trademark of the Advance Solvents and Chemical division of Carlisle Chemical Works, Incorporated.

EXAMPLES 25–27

In the manner described in Example 1, ethylene was polymerized employing 100 pounds kerosene, 13 pounds ethylene, and a total polymerization time of 1.1 hours. The catalyst was prepared from triisobutylaluminum and $TiCl_4$, with an aluminum to titanium mole ratio of 0.5 and a weight ratio of total catalyst to kerosene of 0.005. The polymer slurry was worked up as described in Example 5, above, except that the hexane slurrying and washing operations were eliminated, and drying was at 60° C. Yield of dry polyethylene product was 9 pounds.

Portions of the polyethylene were blended with 0.1 weight percent di-tert-butyl-p-cresol (a rubber antioxidant), plus 0.5 weight percent of the following commercial PVC stabilizers:

Example:
- 25—Dythal—dibasic lead phthalate
- 26—Dyphos—dibasic lead phosphite
- 27—Nuodex V-70—strontium stearate To one portion was added only the antioxidant, as a control. All portions were milled 20 minutes at a roll surface temperature of 170° C. Compression molded test samples were then prepared, and the test data are given in Table XI.

It will be seen that each of the PVC stabilizers gave some protection to the polymer during the milling. The ultimate tensile strengths and elongations increased in the order of listing of the stabilizers. The Dyphos and Nuodex V-70 were outstanding.

*Table X*

| Example No. | Stabilizer (plus 100 p.p.m. Santowhite Crystals) | Stab. Conc. (percent) | 5 Min. milling | | | | 20 Min. milling | | | |
|---|---|---|---|---|---|---|---|---|---|---|
| | | | Color | Strength, p.s.i. | | Elongation, percent | Color | Strength, p.s.i. | | Elongation, percent |
| | | | | Yield | Break | Yield | Break | | Yield | Break | Yield | Break |
| Control | Santowhite Crystals | 100 p.p.m. | 6.5 G | 3,557 | 1,544 | 12 | 337 | 6.0 G | 3,644 | 1,580 | 12 | 310 |
| 16 | Advastab 3 | 0.05 | 8.5 G | 3,755 | 1,680 | 10 | 278 | 8.5 G | 4,130 | 1,753 | 9 | 239 |
| | do | 0.5 | 5.0 G | 3,760 | 1,710 | 11 | 109 | 4.0 G | 4,076 | 1,661 | 9 | 70 |
| 17 | Advastab 52 | 0.05 | 6.0 G | 3,653 | 1,685 | 10 | 319 | 5.5 G | 4,158 | 1,700 | 10 | 229 |
| | do | 0.5 | 4.5 G | 3,548 | 1,682 | 11 | 182 | 4.0 G | 4,029 | 1,747 | 9 | 127 |
| 18 | Advastab OM-10 | 0.05 | 5.0 G | 3,618 | 1,650 | 10 | 246 | 5.0 G | 4,129 | 1,691 | 8 | 237 |
| | do | 0.5 | 4.0 G | 3,670 | 1,750 | 12 | 158 | 3.5 G | 4,000 | 1,756 | 10 | 136 |
| 19 | Advastab 143 | 0.05 | 4.5 G | 3,610 | 1,655 | 11 | 313 | 4.5 G | 3,619 | 1,533 | 12 | 168 |
| | do | 0.5 | 4.0 G | 3,600 | 1,705 | 12 | 184 | 3.5 G | 3,551 | 1,559 | 12 | 127 |
| 20 | Advastab CH-14 | 0.05 | 6.0 G | 3,697 | 1,613 | 11 | 338 | 4.0 G | 3,714 | 1,640 | 12 | 178 |
| | do | 0.5 | 5.0 G | 3,567 | 1,746 | 12 | 118 | 5.0 G | 3,527 | 1,696 | 12 | 169 |
| 21 | Advastab E-6-B | 0.05 | 5.0 G | 3,641 | 1,602 | 12 | 348 | 4.0 G | 3,566 | 1,588 | 12 | 173 |
| | do | 0.5 | 4.0 G | 3,552 | 1,317 | 11 | 110 | 4.0 G | 3,454 | 1,644 | 12 | 138 |
| 22 | Advastab SN | 0.05 | 5.0 G | 3,547 | 1,526 | 11 | 299 | 3.0– | 3,538 | 1,580 | 12 | 158 |
| | do | 0.5 | 3.0– | 3,511 | 1,571 | 12 | 214 | 2.0– | 3,729 | 1,467 | 12 | 65 |
| 23 | Thermolite RS-13 | 0.05 | 5.5 G | 3,636 | 1,619 | 12 | 293 | 4.0 G | 3,687 | 1,570 | 12 | 161 |
| | do | 0.5 | 2.5 – | 3,639 | 1,616 | 15 | 229 | 2.5 – | 3,748 | 1,680 | 12 | 173 |
| 24 | Paraplex G-60 | 0.05 | 5.5 G | 3,553 | 1,633 | 12 | 284 | 4.5 G | 3,689 | 1,625 | 12 | 156 |
| | do | 0.5 | 3.5 – | 3,497 | 1,609 | 13 | 189 | 3.5 – | 3,539 | 1,686 | 12 | 158 |

The data in Table X show in each case the improvement of one or more of color and the various tensile properties, through use of the polyvinyl chloride stabilizers.

Further, the polyethylene containing Advastab OM-10, and that containing Advastab CH-14, each became clear upon cold drawing, with the advantages described in Example 3 for this property.

*Table XI.—Ziegler polyethylene containing 0.1 weight percent di-tert-butyl-para-cresol, plus 0.5 weight percent PVC stabilizer*

[Milled 20 minutes]

| Example No. | PVC Stabilizer | Tensile Properties | | | | Color |
|---|---|---|---|---|---|---|
| | | Strength, p.s.i. | | Elongation, percent | | |
| | | Yield | Break | Yield | Break | |
| Control | None | 3,289 | 1,745 | 12 | 206 | Good. |
| 25 | Dibasic lead phthalate (Dythal) | 3,271 | 1,776 | 11 | 306 | Same as control. |
| 26 | Dibasic lead phosphite (Dyphos) | 3,260 | 1,898 | 12 | 513 | Good, but gray cast. |
| 27 | Strontium stearate | 3,180 | 1,989 | 11 | 643 | Same as control. |

EXAMPLES 28-40

A Ziegler polyethylene composite was made up from the products of several separate batch polymerizations, each of which was carried out approximately as described in Example 5 above. To each of the 100 pound portions of isobutanol used to treat the polymer in the work-up procedure was added 1 gram Santowhite Crystals. Similarly, 0.2 gram Santowhite Crystals was added to the 50 pounds hexane used between the isobutanol and drying steps. A small, unmeasured amount of the Santowhite Crystals remained in the polymer product.

Portions of this polymer were milled for 5 minutes at a roll surface temperature of 170° C., chosen quantities of various PVC stabilizers being incorporated in the early stages of the milling. One control portion (a) had nothing added. Another control portion (b) had only di-tert-butyl-para-cresol added. To another portion (Example 28) was added only strontium stearate (Nuodex V-70). To the other portions (Examples 29-40) di-tert-butyl-para-cresol was added as well as the PVC stabilizer. Test specimens of the resulting materials were then prepared by injection molding at the high temperature of 550° F. Test data are presented in Table XII. The various polyvinyl chloride stabilizers are described by the trade-names under which they are sold, their compositions having been set forth in earlier examples.

tained over a range of 0.1 to 2 percent of the PVC stabilizer.

While strontium stearate is preferred for use at high temperatures, the data in Table XII show certain advantages for the other PVC stabilizers. These data also help to advise the art of limitations that may be encountered and thus will be of assistance in choosing preferred materials for given uses. On these samples, color observations were qualitative only, rather than on the rating scale used for the samples discussed above. The darkening of color encountered with Dythal (Example 34) and Dyphos (Example 35) are believed due to reaction of these lead compounds with sulfur, present in the small amount of Santowhite Crystals remaining in the polymer; marked improvement in tensile properties was obtained, however. The sharp losses of tensile properties encountered with Thermolite RS-13 (Example 38) and Advastab OM-10 (Example 40) are believed to have resulted from breakdown of the stabilizers themselves at the high temperatures; thus, these PVC stabilizers are best reserved for use at lower temperatures. However, some protection of color was obtained. The other PVC stabilizers (Examples 36, 37 and 39) not only gave better color than the antioxidant-containing Control (b), but also better tensile properties.

While the invention has been described with particular reference to preferred embodiments thereof, it will

*Table XII.—High temperature (550° F.) injection moldings of Ziegler polyethylene*

| Example No. | Additive | Conc., weight percent | Tensile Properties | | | | Comments |
|---|---|---|---|---|---|---|---|
| | | | Strength, p.s.i. | | Elongation, percent | | |
| | | | Yield | Break | Yield | Break | |
| Control a | None | | 2,782 | 2,117 | 31 | 360 | Color 3.0 G. |
| Control b | Di-tert-butyl-p-cresol | 0.1 | 2,744 | 3,214 | 18 | 393 | Color 4.5 G. |
| 28 | Nuodex V-70 | 0.5 | 2,799 | 1,893 | 16 | 349 | Color 2.0 G. |
| ALL OF FOLLOWING CONTAINED 0.1 WT. PERCENT DI-T-BUTYL-P-CRESOL | | | | | | | |
| 29 | Nuodex V-70 | 0.1 | 2,771 | 4,179 | 16 | 713 | Color 3.0 G. |
| 30 | do | 0.25 | 2,894 | 4,227 | 13 | 764 | Color 3 G. |
| 31 | do | 0.5 | 2,757 | 4,086 | 14 | 713 | Color 3.5 G. |
| 32 | do | 1.0 | 2,664 | 4,072 | 14 | 705 | Do. |
| 33 | do | 2.0 | 2,718 | 4,073 | 14 | 729 | Color 4.5 G. |
| 34 | Dythal | 0.5 | 2,967 | 3,603 | 13.8 | 621 | Darkens. |
| 35 | Dyphos | 0.5 | 2,935 | 3,283 | 13.9 | 591 | Do. |
| 36 | Paraplex G-60 | 0.5 | 2,848 | 3,121 | 15.1 | 588 | Color less than 4.5 G. |
| 37 | Advastab SN | 0.5 | 2,808 | 3,540 | 16.6 | 543 | Do. |
| 38 | Thermolite RS-13 | 0.5 | 2,918 | 1,885 | 16.6 | 174 | Stabilizer breaks down at this temp. |
| 39 | Advastab 143 | 0.5 | 2,847 | 3,922 | 16.6 | 588 | Color less than 4.5 G. |
| 40 | Advastab OM-10 | 0.5 | 2,893 | 2,600 | 33.0 | 215 | Stabilizer breaks down at this temp. |

Referring to Table XII, Nuodex V-70 (strontium stearate) gives a high degree of protection to the polymer at the severe shear and temperature conditions used. Comparing Example 28 with the Control (a) containing no additive, the tensile strength at yield (which is more important in this case than that at failure because the latter is lower), has not changed significantly, nor has the tensile elongation at failure; the color is definitely better. Di-tert-butyl-p-cresol (DTBPC) alone, i.e., Control (b), gave marked improvement in tensile strength, but the color is poorer than that of Control (a). Comparing these data with Example 31, in which both 0.5% strontium stearate and 0.1% DTBPC were used, a tremendous synergistic effect between the PVC stabilizer and the antioxidant is seen. Thus, use of the two together resulted in a tensile strength (failure) of over 4000 p.s.i., which is twice that of the control with no additive (a) or the material with only the PVC stabilizer (Example 28), and 50% greater than that for the control with only the antioxidant (b). Similarly, the tensile elongation has been doubled. Further, the color is better than that of Control (b) containing only the antioxidant. It will also be noted (Examples 29-33) that the same effects are obbe appreciated that variations from the details given herein can be effected without departing from the invention in its broadest aspects.

We claim:

1. The hydrocarbon polymer obtained by polymerizing at least one unsaturated olefinic hydrocarbon monomer of 2 to 3 carbon atoms in the presence of a Ziegler polymerization catalyst, adapted for the low pressure polymerization of ethylene, wherein said polymer contains trace quantities of Ziegler catalyst residues, stabilized against adverse effects of thermal processing by a small but protective amount of a polyvinyl chloride heat stabilizing agent selected from the group consisting of alkaline earth metal salts of fatty acids, epoxidized organic oils and esters, epoxy resins, organo-tin compounds, organo-lead compounds, organic phosphites and substituted ureas.

2. The hydrocarbon polymer obtained by polymerizing at least one unsaturated olefinic hydrocarbon monomer of 2 to 3 carbon atoms in the presence of a catalyst prepared by the interaction of (a) an aluminum compound of the general formula $R_2AlX$ wherein R is selected from the group consisting of alkyl, cycloalkyl, and aryl radicals and X is selected from the group consisting of hydrogen, halogen, alkyl, cycloalkyl and aryl radicals, with (b) a metal halide selected from the group consisting of the chlorides, bromides and iodides of titanium and zirconium, wherein said polymer contains trace quantities of said catalyst residues, stabilized against adverse effects of thermal processing by a small but protective amount of a polyvinyl chloride heat stabilizing agent, selected from the group consisting of alkaline earth metal salts of fatty acids, epoxidized organic oils and esters, epoxy resins, organo-tin compounds, organo-lead compounds, organic phosphites and substituted ureas.

3. The hydrocarbon polymer of claim 1 wherein the polyvinyl chloride heat stabilizing agent is an alkaline earth metal salt of a fatty acid.

4. The hydrocarbon polymer of claim 1 wherein the polyvinyl chloride heat stabilizing agent is selected from the group consisting of epoxidized organic oils and esters.

5. The hydrocarbon polymer of claim 1 wherein the polyvinyl chloride heat stabilizing agent is an epoxy resin.

6. The hydrocarbon polymer of claim 1 wherein the polyvinyl chloride heat stabilizing agent is an organo-tin compound.

7. The hydrocarbon polymer of claim 1 wherein the polyvinyl chloride heat stabilizing agent is an organo-lead compound.

8. The hydrocarbon polymer of claim 1 wherein the polyvinyl chloride heat stabilizing agent is an organic phosphite.

9. The hydrocarbon polymer of claim 1 wherein the polyvinyl chloride heat stabilizing agent is a substituted urea.

10. The polymer composition of claim 1 wherein the polymer is an ethylene polymer.

11. The polymer composition of claim 1 wherein the polymer is a propylene polymer.

12. The polymer composition of claim 1 wherein the stabilizer is strontium stearate.

13. In a polymeric composition containing a hydrocarbon polymer obtained by the polymerization of an unsaturated olefinic hydrocarbon monomer of 2 to 3 carbon atoms in the presence of a Ziegler polymerization catalyst, adapted for the low pressure polymerization of ethylene, wherein said polymer contains traces of Ziegler catalyst residues, the improvement which comprises stabilizing said composition against adverse effects during thermal processing by the inclusion therein of 0.01 to 5 weight percent of a known polyvinyl chloride heat stabilizing agent selected from the group consisting of alkaline earth metal salts of fatty acids, epoxidized organic oils and esters, epoxy resins, organo-tin compounds, organo-lead compounds, organic phosphites and substituted ureas.

14. In a solid polymeric composition containing as a major constituent, a hydrocarbon polymer obtained by the polymerization of an ethylenically unsaturated olefinic hydrocarbon monomer of 2 to 3 carbon atoms in the presence of a Ziegler polymerization catalyst, adapted for the low pressure polymerization of ethylene, wherein said polymer contains traces of Ziegler catalyst residues, the improvement which comprises stabilizing said composition by the inclusion therein of 0.01 to 5 weight percent of a polyvinyl chloride heat stabilizing agent selected from the group consisting of alkaline earth metal salts of fatty acids, epoxidized organic oils and esters, epoxy resins, organo-tin compounds, organo-lead compounds, organic phosphites and substituted ureas.

15. In a polymeric composition containing as the major constituent a solid hydrocarbon polymer susceptible to degradation during thermal processing, said polymer having been prepared by the polymerization of an ethylenically unsaturated hydrocarbon monomer of 2 to 3 carbon atoms by means of a Ziegler polymerization catalyst, adapted for the low pressure polymerization of ethylene, wherein said polymer contains trace quantities of Ziegler catalyst residues, the improvement which comprises stabilizing said composition against adverse effects during thermal processing by incorporating therein, 0.01 to 5 weight percent of a polyvinyl chloride heat stabilizing agent selected from the group consisting of alkaline earth metal salts of fatty acids, epoxidized organic oils and esters, epoxy resins, organo-tin compounds, organo-lead compounds, organic phosphites, and substituted ureas, and 0.005 to 5 weight percent of a sulfide of a dialkyl phenol.

16. The composition of claim 15 wherein the sulfide of a dialkyl phenol is 4,4'-thiobis-(6-tert-butyl-m-cresol).

References Cited in the file of this patent

UNITED STATES PATENTS

| | | |
|---|---|---|
| 2,075,543 | Reed et al. | Mar. 30, 1937 |
| 2,160,172 | Rosen et al. | May 30, 1939 |
| 2,448,799 | Happoldt et al. | Sept. 7, 1948 |
| 2,462,331 | Myers | Feb. 22, 1949 |
| 2,507,142 | Chaban | May 9, 1950 |
| 2,641,596 | Leistner et al. | June 9, 1953 |
| 2,647,296 | Shive | Aug. 4, 1953 |
| 2,664,378 | Heller | Dec. 29, 1953 |
| 2,674,586 | Welch | Apr. 6, 1954 |
| 2,716,096 | Young et al. | Aug. 23, 1955 |
| 2,721,189 | Anderson et al. | Oct. 18, 1955 |
| 2,734,892 | Carter | Feb. 14, 1956 |
| 2,758,981 | Cooke et al. | Aug. 14, 1956 |
| 2,827,447 | Nowlin et al. | Mar. 18, 1958 |
| 2,834,768 | Friedlander | May 13, 1958 |
| 2,838,477 | Roelen et al. | June 10, 1958 |

FOREIGN PATENTS

| | | |
|---|---|---|
| 584,620 | Great Britain | Jan. 20, 1947 |
| 597,031 | Great Britain | Jan. 16, 1948 |

OTHER REFERENCES

British Plastics, August 1950, pp. 70–72.

Monsanto Australian Abstract 4110/54, July 19, 1955, 1 page.